United States Patent [19]

Tipke

[11] Patent Number: 4,669,743

[45] Date of Patent: Jun. 2, 1987

[54] COLLAPSIBLE WHEELED MATERIAL CARRIER

[75] Inventor: Jim Tipke, Spokane, Wash.

[73] Assignee: Tipke Manufacturing Co., Inc., Spokane, Wash.

[21] Appl. No.: 764,414

[22] Filed: Aug. 12, 1985

[51] Int. Cl.[4] .............................................. B62B 1/12
[52] U.S. Cl. ...................................... 280/42; 280/652
[58] Field of Search .............. 280/652, 653, 655, 651, 280/42, 656, 657

[56] References Cited

U.S. PATENT DOCUMENTS

| 362,868 | 5/1887 | Roberts | 280/47.24 |
|---|---|---|---|
| 2,471,462 | 5/1949 | Toth | 280/653 |
| 2,800,335 | 7/1957 | Clapp | 280/42 |
| 3,135,527 | 6/1964 | Knapp | 280/654 |
| 3,166,339 | 11/1961 | Earley | 280/654 |
| 3,722,904 | 3/1973 | Puckett | 280/653 |
| 4,109,933 | 8/1978 | O'Brian | 280/653 |
| 4,138,140 | 2/1979 | O'Brian et al. | 280/652 |
| 4,253,677 | 3/1981 | Wissler | 280/652 |

FOREIGN PATENT DOCUMENTS

0008931 3/1980 European Pat. Off. ............ 280/652

Primary Examiner—John J. Love
Assistant Examiner—Michael Mar
Attorney, Agent, or Firm—Wells, St. John & Roberts

[57] ABSTRACT

A collapsible wheeled material carrier which folds to a storage position when not in use. The carrier has a frame with transversely folding braces and a folding bottom. It also has a folding extensible handle assembly. The carrier can be hand propelled or moved by a vehicle.

14 Claims, 22 Drawing Figures

COLLAPSIBLE WHEELED MATERIAL CARRIER

FIELD OF THE INVENTION

This invention relates to the design of a collapsible wheeled cart.

BACKGROUND OF THE INVENTION

Conventional carts for transporting material generally require an extensive amount of room for storage. They require a bed or body of sufficient size to carry enough to make them practical. In addition, they have a handle or hitch which extends beyond the bed or body for propelling the cart.

To meet the need for a cart large enough to be practical and to minimize the storage area required for such a cart, there have been various designs for different types of folding carts. There are two problems with these designs. First, many of these carts are designed for a specific purpose, such as spreading fertilizer or seed. These carts are often unsuitable for other uses. Second, some require extensive manipulation of parts or the use of tools in order to change them from a folded to an operable position. Two examples of such folding carts can be found in U.S. Pat. Nos. 4,138,140 and 3,166,339.

BRIEF DESCRIPTION OF THE DRAWINGS

The invention is illustrated in the accompanying drawings, in which.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The present invention arose out of the need for an all-purpose collapsible wheeled material carrier. The carrier has to be large enough to carry a wide variety of loads. It also has to be collapsible to minimize the space required to store it.

There is a need for such a carrier, which can be stored in a much smaller space than it occupies when it is expanded to an operable position. Many people who would utilize such a carrier live in houses with limited storage space. Persons using a carrier to transport items to and from boats or motor homes have very limited storage space. The present invention provides such a carrier. In its collapsed position, it takes up a minimal amount of storage space. Tools are not required to expand the carrier from its storage position to its operable position. In addition, a minimum number of parts have to be manipulated in order to expand and collapse it.

The folding material carrier 10 utilizes support frame 11 generally illustrated in FIGS. 9, 12, 13 and 18. The support frame 11 has two rigid longitudinal side members 12. The longitudinal side members 12 are pivotally joined to foldable braces 13 extending between said side members 12 for movement of the side members 12 between a contracted position adjacent one another and an expanded position rigidly spaced apart from one another.

Figure 9:
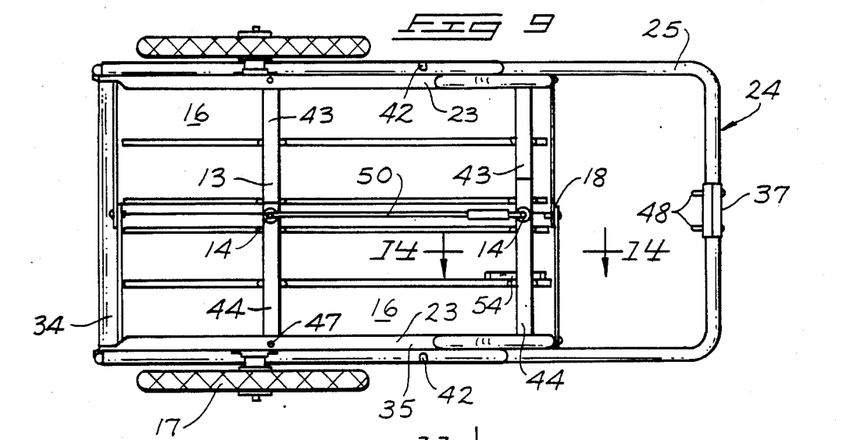
FIG. 9 is a bottom elevational view showing the wheeled material carrier in its expanded position.
Figure 10:
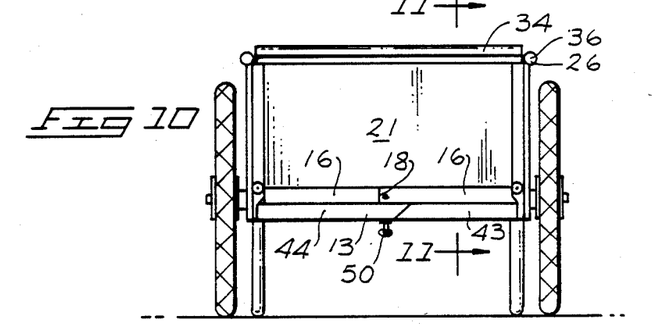
FIG. 10 is an end elevational view taken from the front of the material carrier.
Figure 11:
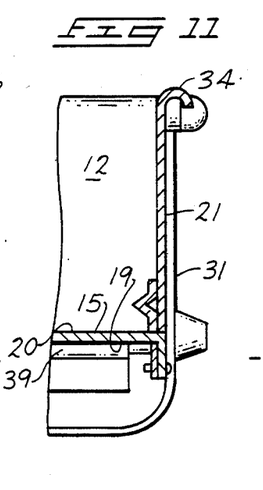
FIG. 11 is a cross-sectional view taken along line 11—11 of FIG. 10.
Figure 12:
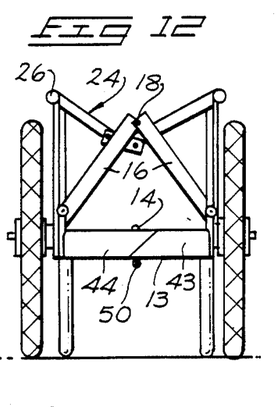
FIG. 12 is an end elevational view taken from the front end of the material carrier showing the carrier approximately half way between its folded and its expanded position.
Figure 13:
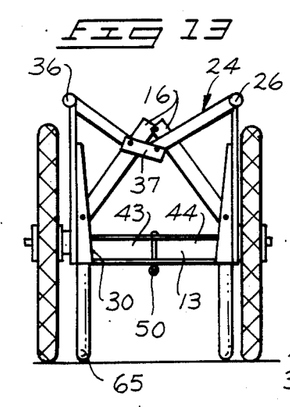
FIG. 13 is an end elevational view taken from the rear of the material carrier showing the carrier when it is approximately halfway between its folded and expanded position.
Figure 18:
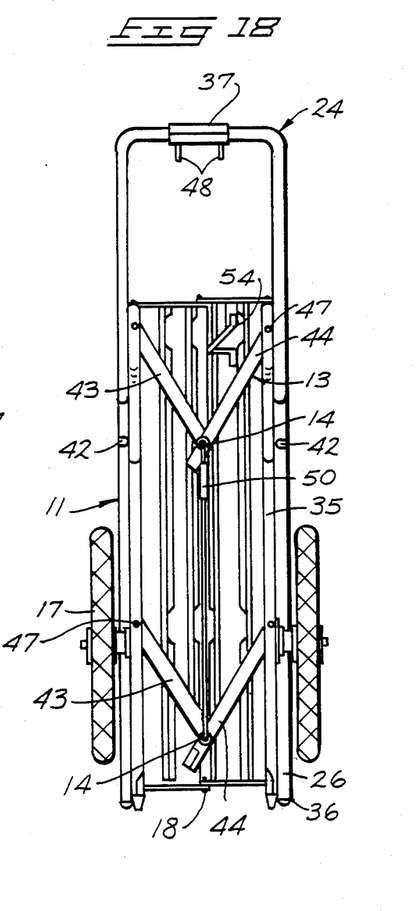
FIG. 18 is a bottom elevational view showing the wheeled material carrier halfway between its folded and expanded position.

The foldable braces 13 have a hinged joint 14. This hinged joint 14 allows the braces 13 to fold along the centerline of carrier 10.

Figure 3:
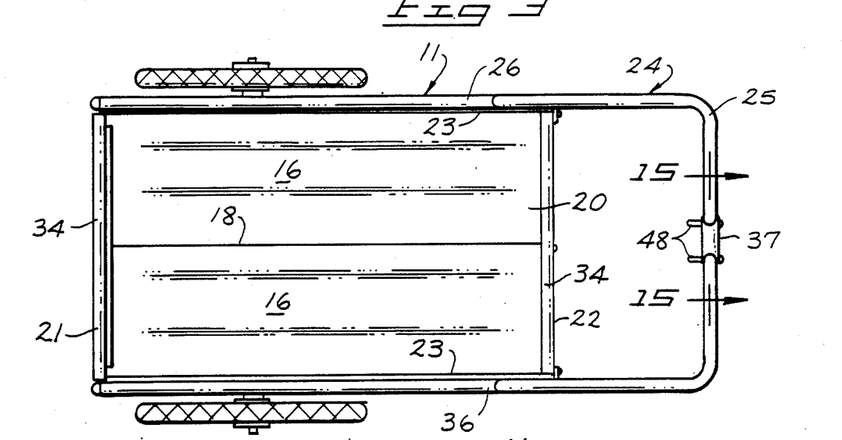
FIG. 3 is a plan view from the top of the wheeled material carrier in its expanded position.

The material carrier 10 also includes a bottom wall 15 shown in FIGS. 3 and 9. The bottom wall 15 is movably connected to support frame 11. It has a hinged joint 18 down its centerline presenting two panels 16 which fold in on each other when the side members 12 are contracted. Panels 16 overlay and are supported by support frame 11 in its expanded position.

Figure 1:
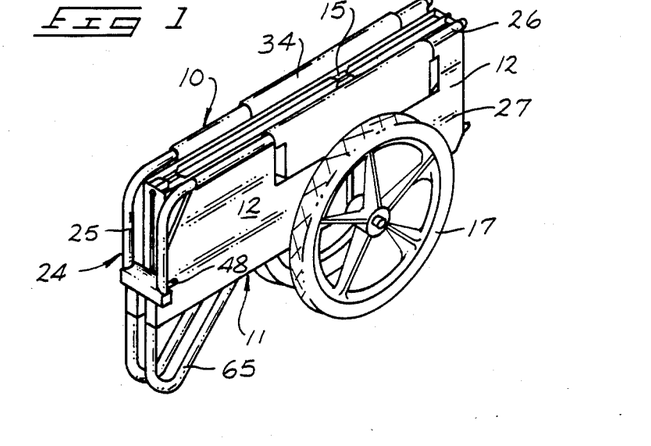
FIG. 1 is a perspective view showing the collapsible wheeled material carrier in its folded position.
Figure 2:
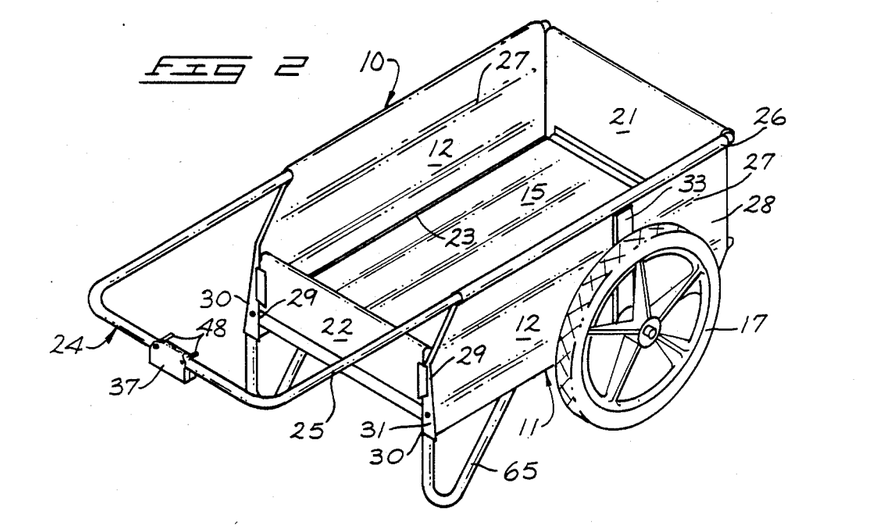
FIG. 2 is a perspective view of a collapsible wheeled material carrier in its expanded position.

Removable front and rear end walls 21 ad 22 are slidably engaged between side members 12 when support frame 11 is in its expanded position (FIG. 2). End walls 21 and 22 have curved edges 34 which fit over side members 12 when the support frame 11 is in its contracted position (FIG. 1).

Curved tubular support legs 65 are attached to one end of support frame 11. The support legs 65 maintain carrier 10 somewhat level.

Ground engaging wheels 17 are rotatably mounted to side members 12 along a common transverse axis (not shown). It should be noted that the wheels 17 are not mounted on an axle which ordinarily would extend across the width of a material carrier 10. The absence of an axle spanning the width of the carrier 10 is one of the features which allows support frame 11 to be contracted in a transverse fashion to a storage position.

An extensible folding handle assembly 24 generally shown in FIGS. 1, 2, 3 and 4 is movably engaged with the side members 12. Cylindrical handles 25 are slidably engaged within cylindrical tubes 26 formed along the upper longitudinal edge of side members 12. When the carrier 10 is in its open position as shown in FIG. 2, the handle assembly 24 is extended. When the carrier is fully contracted (FIG. 1), the handles 25 are inserted further within tubes 26.

Figure 4:
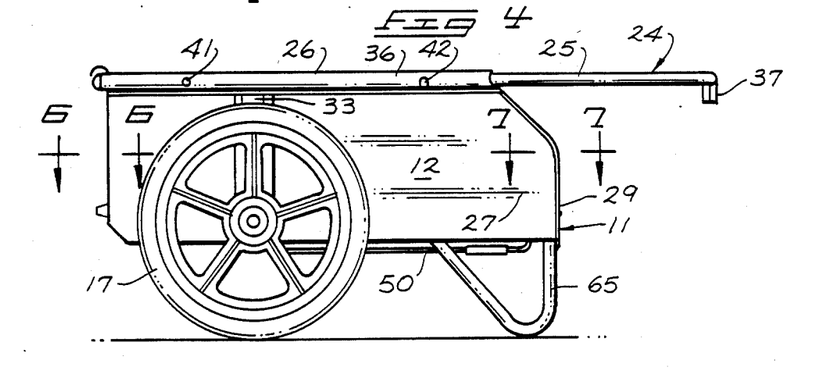
FIG. 4 is a side elevational view of the wheeled material carrier in its expanded position.
Figure 5:
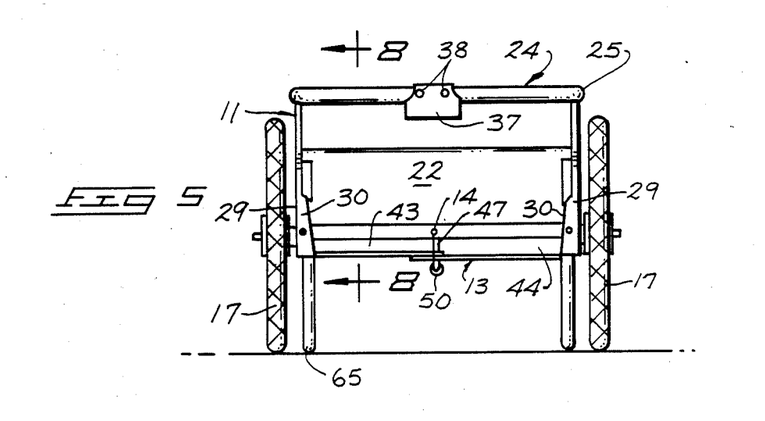
FIG. 5 is an end elevational view of the wheeled material carrier taken from the rear of the carrier.
Figure 6:
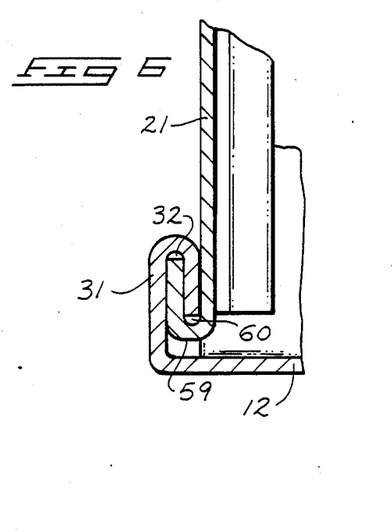
FIG. 6 is a cross-sectional view taken along line 6—6 of FIG. 4.

Referring to FIGS. 2, 4 and 6, it can be seen that side members 12 are of unitized construction. They extend outwardly of foldable braces 13 forming two side walls for retaining articles or material being transported in the carrier. As an alternative method of construction, longitudinal side rails (not shown) could be utilized. The foldable braces 13 would then be pivotally attached to the side rails. Side walls could be attached to the side rails.

Figures 14, 16:
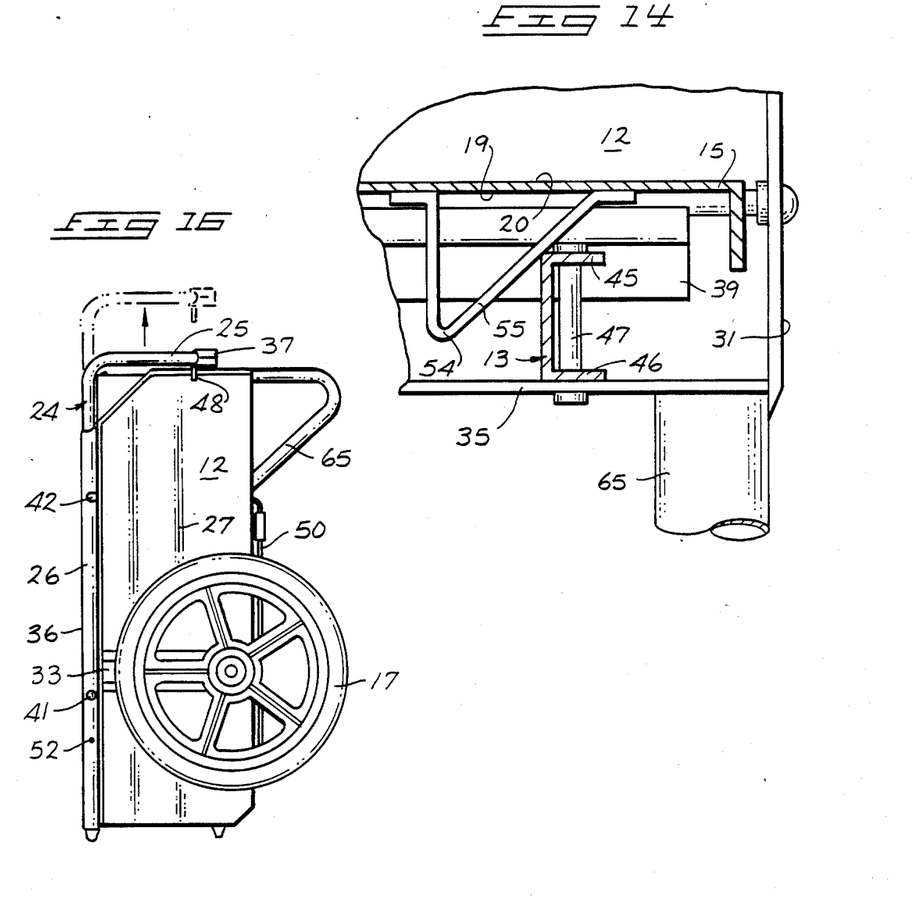
FIG. 14 is a fragmentary cross-sectional view taken along line 14—14 of FIG. 9.
FIG. 16 is a side elevational view of the wheeled material carrier positioned on its front end.

As shown in FIGS. 9 and 14, the bottom or first longitudinal edges of side members 12 are bent inwardly at approximately 90°, forming flanges 35. Flanges 35 reinforce and stiffen the side members 12. They also provide mounting supports for the foldable braces 13 as described below.

Figure 7:
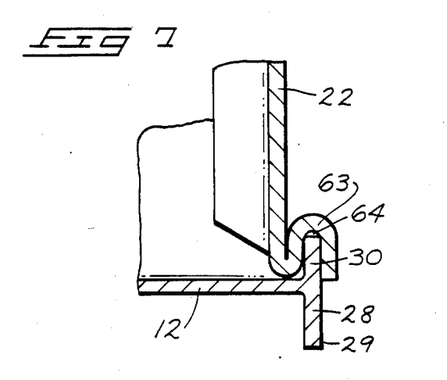
FIG. 7 is a cross-sectional view taken along line 7—7 of FIG. 4.
Figure 8:
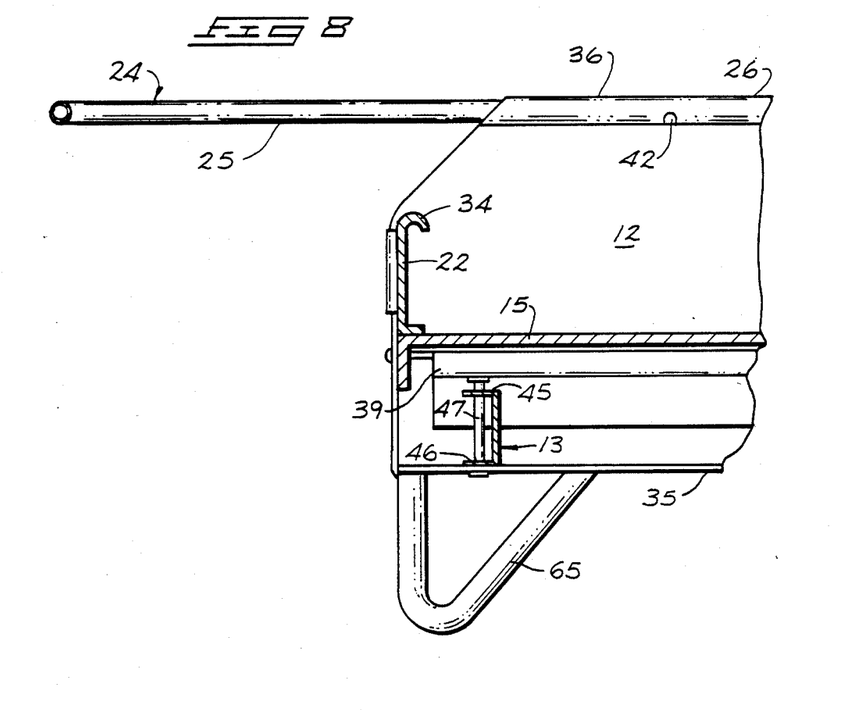
FIG. 8 is a cross-sectional view taken along line 8—8 of FIG. 5.

The first end edges 28 of side members 12 are formed as shown in FIG. 7. The outer flanges 29 provides stiffening for side member 12. The inner flanges 30 are slidably engaged with rear end wall 22 when the end wall 22 is installed.

The second end edges 31 of side members 12 are formed as shown in FIG. 6. The second end edges 31 are bent to form slots 32 which are approximately perpendicular to side member 12. The front end wall 21 is slidably engaged within slots 32 when it is installed.

Longitudinal brace mounting members 39 are connected to side members 12. They are parallel to and spaced above the flanges 35 along the first longitudinal side edges of side members 12. The mounting members 39 perform two functions. They support the bottom wall 15 adjacent to the longitudinal side edges 40 of bottom wall 15 when the support frame 11 is in its expanded position. The mounting members 39 also provide mounting supports for the foldable braces 13, in conjunction with flanges 35 detailed above.

The upper or second longitudinal edge 36 of side members 12 are bent over to form cylindrical tubes 26 as shown in FIGS. 1, 10, 11 and 12. The tubes 26 slidably receive handle assembly 24.

Figure 17:
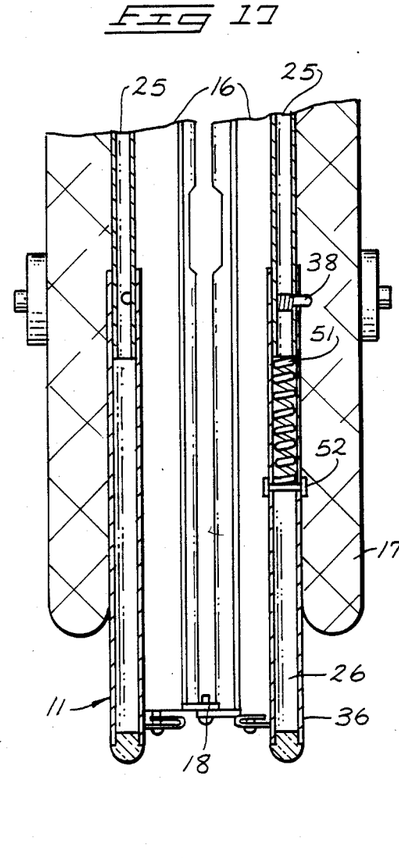
FIG. 17 is a fragmentary cross-sectional view taken along line 17—17 of FIG. 16.

As shown in FIG. 4, 9, 17 and 18, the cylindrical tubes have locking holes 41 and locking slots 42. Locking holes 41 receive spring loaded handle detents 38 when handle assembly 24 is in its collapsed position (FIG. 17). Locking slots 42 receive handle detents 38 when handle assembly 24 is in its extended position (FIG. 4). The handle detents 38 hold the handle assembly 24 in the desired position when the detents 38 are engaged in locking holes 41 or locking slots 42.

An extender spring 51 shown in FIG. 17 is slidably engaged in one of cylindrical tubes 26 between the extender spring stop 52 located in one of cylindrical tubes 26 and the end of one of handles 25. The spring 51 imparts outward movement to handle assembly 24 when handle detents 38 are disengaged from locking holes 41.

The side members 12 also have longitudinal stiffening ridges 27. These longitudinal ridges 27 give side members 12 additional rigidity. Wheel mounting rails 33 also provide additional rigidity to side members 12.

Foldable braces 13 each include a first and a second brace element 43 and 44, as shown in FIGS. 9 and 18.

Elements 43 and 44 are connected by a hinged joint 14. Joint 14 has an axis coplanar with and perpendicular to the longitudinal axis of the bottom wall 15. The inner end of second brace element 44 overlaps the inner end of first brace element 43, as illustrated in FIG. 9. This prevents the braces 13 from folding beyond their completely expanded and aligned position, and provides structural rigidity to them.

First and second brace elements 43 and 44 are formed as C-shaped channels, as illustrated in FIG. 14. Elements 43 are slightly narrower than elements 44 and fit between elements 44. With this configuration braces 13 can be completely collapsed transversely.

Upper and lower flanges 45 and 46 of brace elements 43 and 44 have holes (not shown) adjacent the side members 12, through which connecting pins 47 are pivotally engaged. One end of each connecting pin 47 is attached to mounting members 39. The other end is attached to flange 35 along the first longitudinal edge of side members 12. The brace elements 43 and 44 pivot about the connecting pins 47 when the braces 13 are folded or expanded. The pivotal axes of elements 43 and 44 about connecting pins 47 are parallel to the axes of joints 14.

As shown in FIGS. 9 and 18, an actuator rod 50 is pivotally connected to the hinged joints 14 of foldable braces 13. The actuator rod 50 imparts conjoint movement to both foldable braces 13 during contraction and expansion of support frame 11.

Any suitable means of pivotally connecting foldable braces 13 to side members 12 can be utilized in the practice of the present invention.

In the embodiment shown, bottom wall 15 includes two panels 16, each having first and second opposed panel surfaces 19 and 20 extending between longitudinal side edges 23. One of the longitudinal side edges 23 of each panel 16 is pivotally connected to the adjacent side member 12. The bottom wall 15 has a hinged joint 18 down its longitudinal centerline, joining the other edges of panels 16. Hinged joint 18 permits the bottom wall 15 to move from a storage position clear of foldable braces 13 in their contracted position to an operational position with the first panel surfaced 19 engaged with and supported by foldable braces 13 in their expanded position.

The axis of the bottom wall longitudinal hinged joint 18 is coplanar with and perpendicular to the axes of the foldable brace hinged joints 14.

An inclined camming bracket 54 is connected to the bottom surface 19 of one of the panels 16. The inclined surface 55 of camming bracket 54 engages one of foldable braces 13 during its initial movement from an expanded to a contracted position, causing the brace 13 to ride along inclined surface 55 as shown in FIG. 14. This imparts initial outward motion to bottom wall 15, forcing the panels of bottom wall 15 from their flat, coplanar positions.

Figure 15:
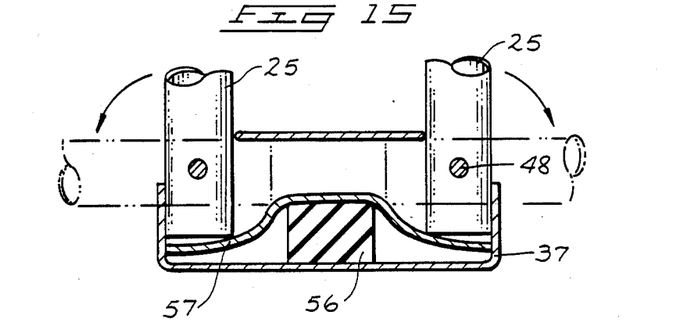
FIG. 15 is a fragmentary cross-sectional cutaway view taken along line 15—15 of FIG. 3.

A locking bracket 37 connects the ends of handles 25. As shown in FIG. 15, the bracket contains a block of resilient material 56 which resiliently supports a locking clip 57. The handles 25 are retained in locking bracket 37 by handle pivot pins 48. When the handle ends 25 are installed in locking bracket 37, the handles 35 ride along locking clip 57 and compress the block of resilient material 56. This provides an over-the-center toggle type action both when the handles 25 are in their collapsed position and when they are in their extended position.

As illustrated in FIGS. 1 and 16, the handle pivot pins 48 fit over outer flanges 29 of side members 12 when carrier 10 is collapsed. The handle pivot pins 48 prevent the carrier 10 from expanding when handle assembly 24 is in its collapsed position.

Front wall 21 is used for selectively spanning side members 12 when said side members 12 are in their expanded position. As illustrated in FIG. 6, the side edges 59 of front wall 21 are folded over to form a guide slot 60. When the movable front wall 21 is installed, guide slot 60 fits around and is slidably engaged with slot 32 on side members 12. The fit between front end wall 21 and slot 32 is tight enough that removable front wall 21 will remain in position when the front slot 32 is in engagement within guide slot 60.

Removable rear wall 22 has side edges 63 which are curved as shown in FIG. 7 to form a guide slot 64. When rear wall 22 is installed in position spanning longitudinal side members 12 at their first end edges 28, guide slot 64 slidably receives inner flanges 30.

Figure 19:
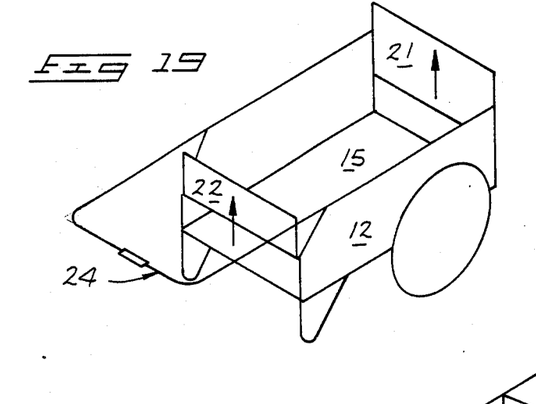
FIGS. 19 through 22 are schematic line drawings showing the procedure for folding the wheeled material carrier.
Figure 20:
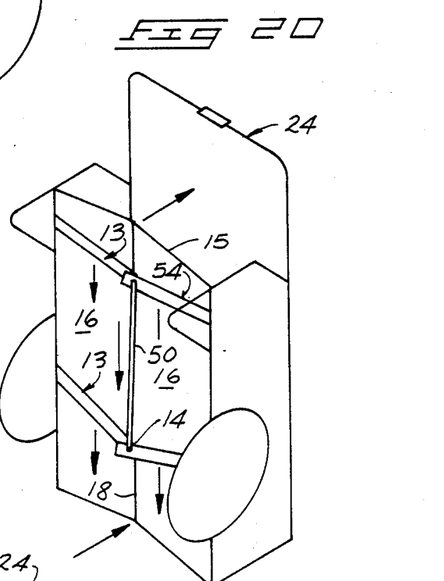
Figure 21:
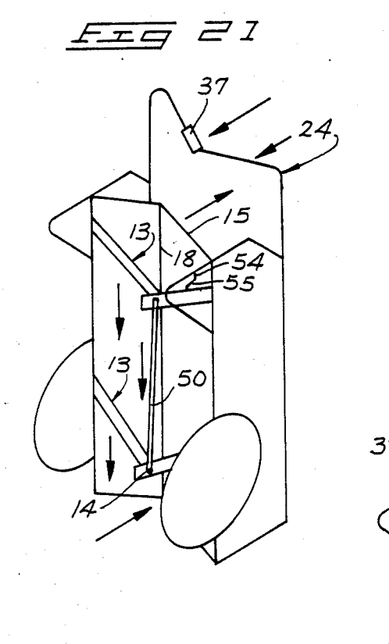
Figure 22:
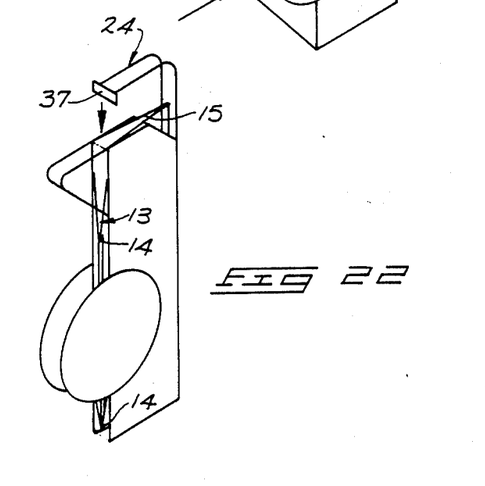

FIGS. 19 through 22 illustrate the operation of the wheeled material carrier 10 as it is contracted from its fully open and extended condition as shown in FIG. 19 to its fully contracted storage position as illustrated in FIG. 22.

As shown in FIG. 19, the first step in contracting the carrier 10 is to remove front and rear end walls 21 and 22. This is done by grasping them and lifting them upwardly until they are no longer engaged between side members 12.

To facilitate folding of the support frame 11 and bottom wall 15, the cart should be tipped so that the second end edges 31 of side members 12 rest on the ground and handle assembly 24 extends upward, as illustrated in FIG. 20. Placing the cart in this upright position facilitates further folding.

With the cart positioned as shown in FIG. 20, downward pressure can be exerted on actuator rod 50. This downward pressure is transmitted to the hinged joints 14 of foldable braces 13, which causes foldable braces 13 to start folding. As the foldable braces 13 start folding, side members 12 start contracting transversely toward one another. At the same time, second brace element 44 slidably engages inclined surface 55 of camming bracket 54, which imparts outward motion to bottom panel 16. This in turn causes folding action along the longitudinal axis of bottom wall 15, as shown in FIG. 20. When the distance between side members 12 has been reduced approximately one-third, as illustrated in FIG. 21, pressure can be applied in the direction shown to either end of the handle locking bracket 37. This overcomes the over-the-center toggle action provided by the block of resilient material 56 forcing locking clip 57 against handles 25. Once this toggle action is overcome, handle assembly 24 can fold as shown in FIG. 21 simultaneously with the folding action of foldable braces 13 and bottom wall 15.

When the cart has reached the contracted storage position as shown in FIG. 22, the extensible handle assembly 24 can be collapsed. This is done by applying pressure against detents 38 which are located on handles 25 and protrude through locking slots 42 when handle assembly 24 is in its extended position. When the detents 38 are depressed to clear the edges of locking slots 42, downward pressure can be exerted against handle assembly 24 as shown in FIG. 22. Handles 25 are slidably inserted further into cylindrical tubes 26. At the same time the extender spring 51 located in one of cylindrical tubes 26 is compressed against extender spring stop 52. When handle assembly 24 has reached its fully collapsed position, one of the detents 38 on a handle 25 snaps into locking hole 41 located on one of the cylindrical tubes 26. This detent 38 locks the extensible handle assembly 24 in its completely collapsed storage position. With handle assembly 24 in its completely collapsed position, handle pivot pins 48 slidably engage outer flanges 29 at the first end edges 28 of side members 12. This is illustrated in FIGS. 1 and 16. With the handle pivot pins 48 so positioned, the cart is locked in its fully contracted storage position.

To change the cart from its fully contract storage position to its expanded operable position, pressure is applied to detent 38. Once detent 38 clears the edges of locking hole 41, compressed extender spring 51 automatically extends handle assembly 24 to a partially extended position illustrated in dashed lines in FIG. 16. With handle assembly 24 partially extended, handle pivot pins 48 are clear of outer flanges 29 on side members 12. The support frame 11 of carrier 10 can then be expanded. To do so, upward pressure is exerted along actuator rod 50. This forces the hinged joints 14 of foldable braces 13 upward, causing foldable braces 13 to expand and moving side members 12 apart. When the side members 12 are aligned, the inner end of brace element 44 overlaps the inner end of brace element 43. Manual pressure can then be exerted against handle bracket 37 causing the over-center action discussed above to lock handles 25 in their fully unfolded position. Finally, handle assembly 24 must be pulled outwardly from cart 10 until detents 38 snap into locking slots 42. The cart is now in its completely expanded operable condition.

While the description has been directed to an embodiment of the invention used as a hand-propelled cart, the described structure can also be incorporated into a vehicle drawn trailer. To do so, the handle assembly 24 would be converted to a hitch assembly.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A collapsible wheeled material carrier, comprising:
   a support frame including a pair of rigid longitudinal side members, said side members having plural rigid foldable brace means extending between them, said brace means having opposed ends pivotally connected to the respective the side members and having hinged joints for allowing the brace means to fold along the centerline of the support frame between a contracted position of the support frame wherein the brace means are angularly folded and the side members are positioned adjacent one another and an expanded position of the support frame wherein the brace members are unfolded and arranged perpendicular to the side members and the side members are parallel and transversely spaced apart from one another;
   a rectangular bottom wall having first and second opposed panel surfaces extending between longitudinal side edges, said longitudinal side edges being pivotally connected to the respective side members, said bottom wall having a hinged joint down its longitudinal center line for foldable movement of the bottom wall between a storage position with the bottom wall clear of the foldable brace means when the support frame is in its contracted position and an operational position with the first panel surface of the bottom wall engaged with and supported by the foldable brace means and side members when the support frame is in its expanded position; and a pair of rotatable wheels independently mounted to the respective side members of the support frame on individual axles aligned along a common transverse axis positioned adjacent to the pivotal connections of one of said brace means and said side members.

2. The collapsible wheeled material carrier of claim 1 further comprising:

actuator means pivotally connected to the foldable brace means, for imparting conjoint folding and unfolding motion to said foldable brace means.

3. The collapsible wheeled material carrier of claim 1 further comprising:

an extensible folding handle assembly slidably mounted to the side members for movement between an extended position and a retracted position, the handle assembly being foldable conjointly with the brace means from an open position spanning the side members when the support frame is in its expanded position to a closed position when the brace means is in its contracted position, the handle assembly being folded conjointly with the brace means.

4. The collapsible wheeled material carrier of claim 1, wherein said side members have first and second panel surfaces extending between first and second longitudinal side edges and first and second end edges, further comprising:

removable end wall means for selectively spanning the end edges of the side members when said side members are in their expanded position.

5. The collapsible wheeled material carrier of claim 1, further comprising:

camming means attached to the first panel surface of the bottom wall responsive to initial movement of the foldable brace means from their unfolded position to their folded position for imparting conjoint movement to the bottom wall.

6. The collapsible wheeled material carrier of claim 1, wherein upper surfaces of said inwardly facing flanges are parallel to the side edges of the bottom wall and are underlying and supporting the bottom wall adjacent its side edges when the support frame is in its expanded position.

7. The collapsible wheeled material carrier of claim 1, further comprising:

an extensible folding handle assembly slidably mounted to the side members for movement between an extended position and a retracted position, the handle assembly being foldable conjointly with the brace means from an open position when the support frame is in its expanded position to a closed position when the support frame is in its contracted position, the handle assembly folding conjointly with the brace means; and releasable locking means attached to said handle assembly for securing said carrier in its collapsed position.

8. A collapsible wheeled cart, comprising:

a support frame, including two rigid longitudinal side walls having first and second longitudinal edges and first and second ends each of said side walls having a pair of upper and lower inwardly facing parallel flanges, said side walls having two or more foldable rigid braces extending between them, said braces having opposed ends pivotally connected to the inwardly facing flanges of each side wall, said foldable braces each having a hinged joint equidistant from the side walls for movement of the braces from a folded position with the side walls adjacent one another to an unfolded position with the side walls being parallel and spaced apart and the braces arranged perpendicular to the side walls;

a rigid rectangular bottom wall having first and second longitudinal sides and a hinged joint at its longitudinal center line, the respective longitudinal sides of the bottom wall being pivotally connected to the opposing side walls for movement from a storage position with the bottom wall clear of the braces in their folded position to an operational position with the bottom wall overlying and supported by the braces in their unfolded position; and a pair of rotatable wheels independently mounted to the respective side walls of the support frame on individual axles aligned along a common transverse axis positioned adjacent to the pivotal connections between one of said braces and the respective side walls.

9. The collapsible wheeled material carrier of claim 8 further comprising:

a longitudinal actuator rod having a longitudinal axis, said actuator rod being pivotally connected to the hinged joint at the center of the foldable braces, responsive to force applied along its longitudinal axis to impart conjoint folding and unfolding movement to the braces.

10. The collapsible wheeled cart of claim 8 wherein one of the longitudinal edges of each side wall is bent over to present a longitudinal cylindrical tube, further comprising:

a pair of handles each having one end slidably engaged within a cylindrical tube for movement of the handles from a collapsed position to an extended position.

11. The collapsible wheeled cart of claim 8 wherein the first end edges of the side members present inwardly facing flanges and wherein the second end edges are bent to form a slot substantially perpendicular to the side walls, further comprising:

a front end wall slidably engaged in said slot.

12. The collapsible wheeled cart of claim 8 wherein the first end edges of the side members present inwardly facing flanges and wherein the second end edges are bent to form a slot substantially perpendicular to the side walls, further comprising:

a front end wall slidably engaged in said slot; and a rear end wall slidably engaged between said inwardly facing flanges.

13. The collapsible wheeled cart of claim 8 wherein one of the longitudinal edges of each side wall is bent over to present a longitudinal cylindrical tube, further comprising:

a pair of handles each having one end slidably engaged within a cylindrical tube for movement of the handles from a collapsed position to an extended position, said handles having opposite ends bent at an angle of 90° with respect to the cylindrical tubes;

a bracket pivotally attached between the bent opposite ends of the handles; and spring means mounted in said bracket, said spring means being in resilient engagement with the respective opposite ends of the handles for providing an over-center force against the ends as the handles pivot with respect to the bracket.

14. The collapsible wheeled cart of claim 13, wherein the bracket is pivotally attached between the bent opposite ends of the handles by a pair of pivot pins that protrude to one side of the bracket and are adapted to slidably engage one end of each side wall when the side walls are adjacent one another and the handles are in their respective collapsed positions.

* * * * *